J. D. GALLAGHER.
APPARATUS FOR MAKING PLATE ICE.
APPLICATION FILED MAY 20, 1908.
993,771.
Patented May 30, 1911.
3 SHEETS—SHEET 1.
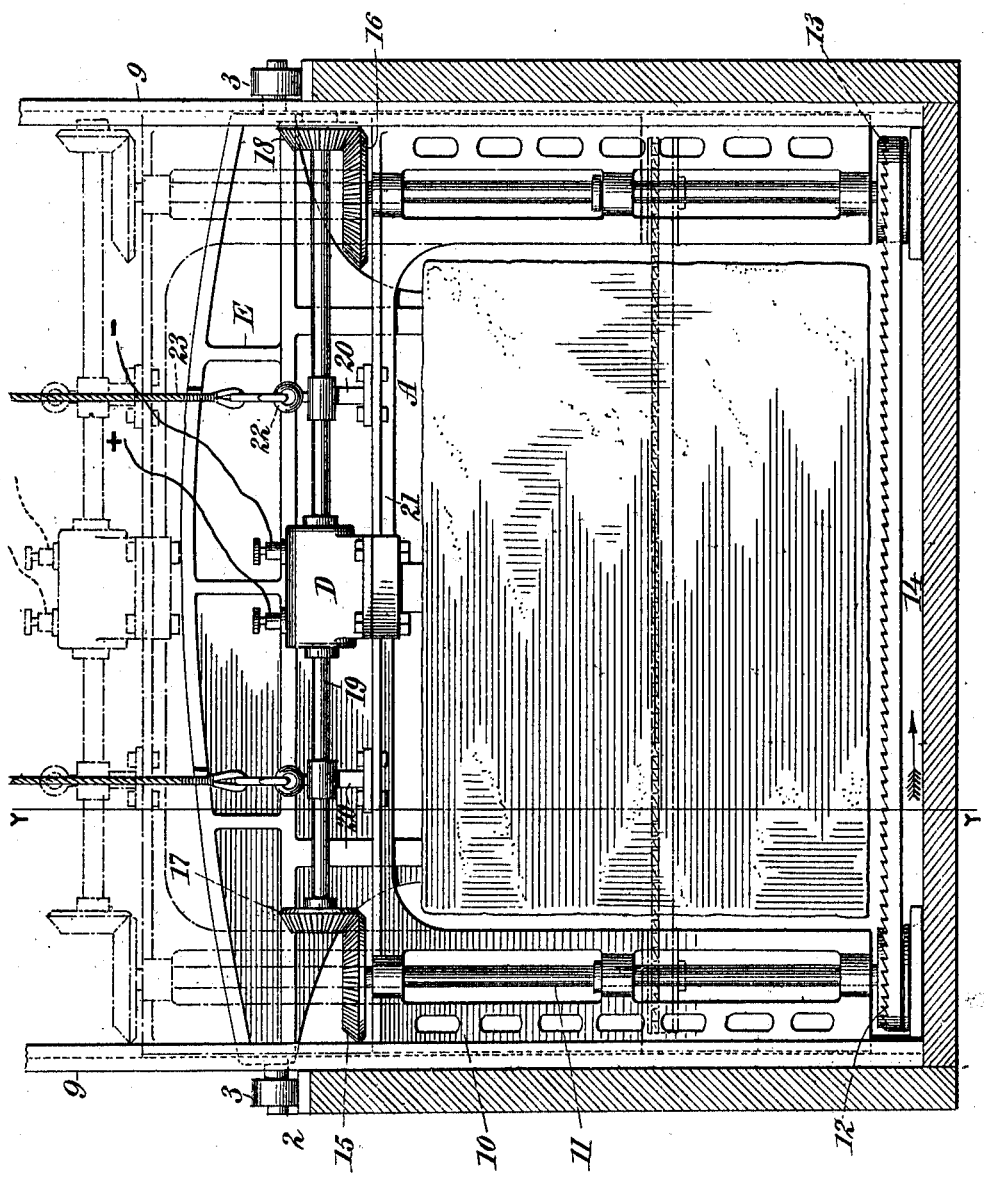
WITNESSES:
M. Van Nortwick
John B. White.
INVENTOR
Joseph D. Gallagher
BY
ATTORNEY

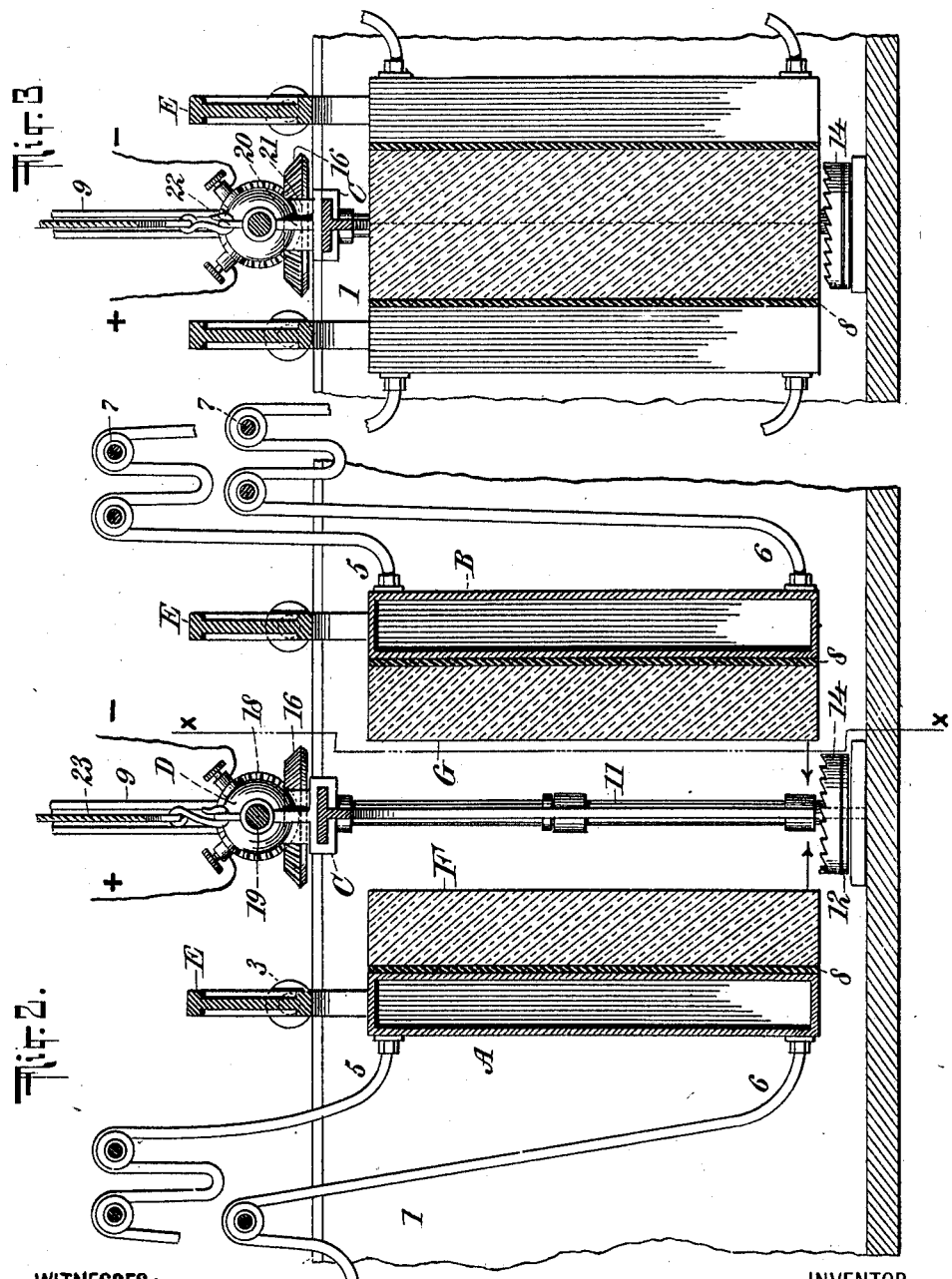

J. D. GALLAGHER.
APPARATUS FOR MAKING PLATE ICE.
APPLICATION FILED MAY 20, 1908.
993,771.
Patented May 30, 1911.
3 SHEETS—SHEET 3.
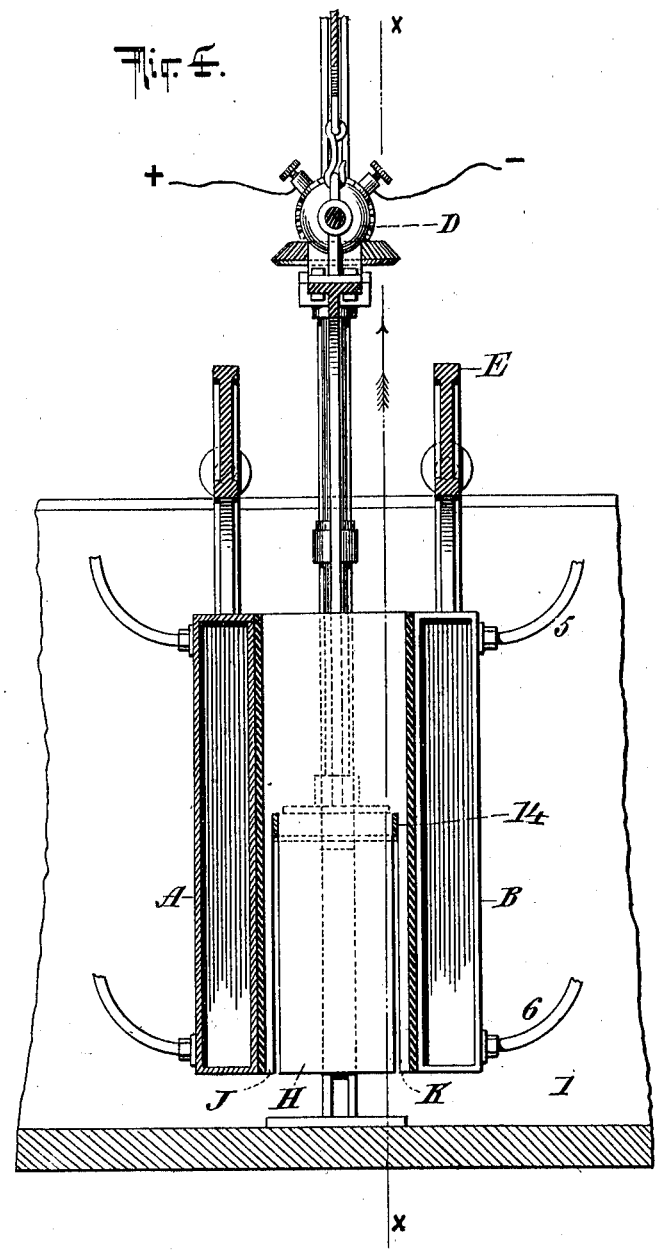

UNITED STATES PATENT OFFICE.

JOSEPH D. GALLAGHER, OF GLEN RIDGE, NEW JERSEY, ASSIGNOR TO NEW JERSEY PATENT HOLDING COMPANY, A CORPORATION OF NEW JERSEY.

APPARATUS FOR MAKING PLATE-ICE.

993,771. Specification of Letters Patent. Patented May 30, 1911.

Application filed May 20, 1908. Serial No. 433,801.

*To all whom it may concern:*

Be it known that I, JOSEPH D. GALLAGHER, a citizen of the United States, and a resident of Glen Ridge, in the county of Essex and State of New Jersey, have made and invented certain new and useful Improvements in Apparatus for Making Plate-Ice, of which the following is a specification.

The invention relates to the making of plate ice preferably in accordance with the general method set forth in U. S. Letters Patent No. 745,549, granted to W. J. Woodcock, December 1, 1903.

The principle of the invention consists in 1. The removal of the ice cake, after it has been formed on the freezing plate, by means of a band saw or other cutting device disposed and operated within the tank, whereby any thawing off of the cake is rendered needless. 2. The formation of ice cakes on the opposite surfaces of two separate freezing plates, which cakes are then brought together to cause their faces to unite by regelation, thus producing a single ice cake directly in the path of the cutting device, which cutting device is then actuated and fed to divide the cake in two planes, so that the middle portion of said cake being thus separated, may be removed from the tank by any suitable means.

The invention consists in the apparatus constituting one and the best operative embodiment I now know of this principle; and more particularly in the combinations pointed out in the claims.

In another application for Letters Patent, Serial No. 433,802 filed May 20, 1908, I have claimed the method of making blocks or cakes of plate ice herein also disclosed.

In the accompanying drawings—Figure 1 is a transverse section of the apparatus on the line $x$ $x$ of Figs. 2 and 4. Fig. 2 is a longitudinal section of the apparatus on the line $y$ $y$ of Fig. 1, showing the freezing plates separated, but with the ice cakes already formed thereon. Fig. 3 is a view similar to Fig. 2, showing the freezing plates moved so that the faces of the ice blocks meet and freeze together thus forming the two ice cakes into one. Fig. 4 is a similar view showing the band saw moving upward through the completed ice cake and cutting the same from the ice plates.

The tank 1 which receives the water to be frozen is preferably provided at its upper longitudinal edges with rails or guards 2 of metal, upon which run the supporting rollers 3 on the ends of the girders E, from which depend the hollow freezing plates A, B. Said girders and hence the plates suspended from them in the tank 1 are freely movable toward and from one another. The plates A, B, are made hollow to receive cooled brine or any other suitable refrigerating material which circulates through them: said material entering each plate from the source of supply through a flexible pipe 5, and escaping through another flexible pipe 6. Any suitable means may be provided, such as rollers 7, for supporting said pipes, by reason of the flexibility and length of which the freezing plates A, B, may be moved as stated without affecting the continuity of the supply of refrigerating material to them. Upon a vertical face of each plate is a layer or coating of rubber 8, forming a yielding surface, upon which the plate ice is formed in accordance with the method fully described in U. S. Letters Patent No. 745,549, granted to W. J. Woodcock, December 1, 1903.

Supported in vertical ways 9 in the tank 1 and between the freezing plates A, B, is a metal frame C, in the vertical members 10 of which are journaled shafts 11. At their lower ends said shafts carry horizontal flanged pulleys 12, 13, which support the band saw 14. The said saw is disposed teeth upward, with its back resting upon the flanges on pulleys 12, 13. At the upper ends of shafts 11, are bevel gears 15, 16, which engage with bevel gears 17, 18, on a transverse shaft 19, supported in bearing standards 20 on the upper transverse member 21 of frame C. Said shaft carries the rotor of an electric motor D, also supported on member 21. Preferably on the bearing standards 20 are eyes 22, in which engage the cords 23, communicating with any suitable hoisting apparatus not shown, whereby the frame C and all of the parts supported thereon may be raised vertically in the ways 9, as shown in dotted lines Figs. 1 and 4.

The operation is as follows: The frame C is initially disposed in its lowest position, as shown in Fig. 2. Refrigerating material being caused to circulate through the plates A, B, ice cakes F, G, are formed upon the yielding surfaces 8. The freezing plates are then moved until the opposing faces of the cakes F, G, meet and freeze together by regelation, as shown in Fig. 3, thus forming a single cake extending between the yielding surfaces of the two plates. The electric motor D, now being set in operation, the shaft 19 thereof communicates motion through the bevel gears to the vertical shafts 11, and so to the band saw 14. The frame C is now gradually raised by means of the cords 23, and as the band saw is fed upward it cuts two kerfs in the ice respectively adjacent to the faces of the ice plates A, B, as clearly shown in Fig. 4, in which the frame C and saw are represented with said saw fed about half way through the cake. As soon as the saw passes entirely through the cake, the middle portion H thereof is freed, and will float to the surface of the water in tank 1, whence it may be removed by any suitable means. A thin cake of ice J, K, Fig. 4, remains adherent to the freezing plate surfaces, and upon these cakes J, K, after the freezing plates have been moved asunder, new cakes F, G, begin to form. Meanwhile, the frame C is lowered to bring the saw again to its bottom position, and when the new cakes become of sufficient thickness, the operation already detailed is repeated. It will of course be understood that the ice will form on both sides or faces of the freezing plate, that forming on the outer faces of the two end plates being allowed to remain until it has reached the normal size, that is, until about ten and one-half inches in thickness, when it may be removed.

By this means and method I am enabled to produce rapidly plate ice blocks of unusually great thickness. I also completely eliminate all thawing off operations which not only take time to perform, during which ice production by the apparatus necessarily stops, but which also involve more or less increase of temperature in the apparatus, which has to be reduced before the next freezing takes place. I thus provide a continuous process of plate ice manufacture at temperatures below zero degrees Fahrenheit, without intermittent rise of temperature of the material circulating in the freezing plates, and without the use of any thawing off means whatever, and at the same time I insure the production of ice in large cubical blocks thus enhancing its keeping qualities and permitting it to be divided into smaller masses to the best advantage.

While I have here shown and described both freezing plates as movable, it will, of course, be understood that I may leave one stationary and move the other.

I claim:

1. The combination with a tank and a vertically arranged freezing plate located therein, of a band saw located adjacent the lower end of said plate, means for operating said band saw, and means for feeding said band saw upward to thereby separate a cake of ice from said freezing plate.

2. The combination of a tank, a freezing plate and a band saw therein, and mechanism for actuating said saw and for feeding the same to divide the ice cake formed on said plate.

3. The combination of a tank and two vertically arranged parallel freezing plates therein having their freezing surfaces disposed opposite one another, both of said plates being movable to vary the distance between said freezing surfaces, sawing mechanism arranged adjacent the lower ends of said plates and adapted to divide the cake of ice formed between said plates along two parallel planes, means for operating said sawing mechanism, and means for feeding said sawing mechanism upward between said plates.

4. The combination of a tank, two vertically arranged parallel freezing plates movable therein and having their freezing surfaces disposed opposite one another and mechanism movable in a vertical plane for dividing in two planes the ice cake formed between said freezing surfaces.

5. The combination of a tank, two vertically arranged parallel freezing plates movable therein and having their freezing surfaces disposed opposite one another and mechanism movable in vertical planes for simultaneously dividing in two planes the ice cake formed between said surfaces.

6. The combination of a tank, two vertically arranged parallel freezing plates movable therein and having their freezing surfaces disposed opposite one another, two traveling cutting devices disposed between said surfaces and adjacent the lower ends of said freezing plates and mechanism for feeding said cutting devices respectively upward in planes substantially parallel to said surfaces.

7. The combination of a tank, two freezing plates therein having their freezing surfaces disposed opposite one another, a traveling endless cutting band disposed between said surfaces, a portion of said band extending transversely across and in proximity to each of said surfaces, and mechanism for feeding said band to divide in two planes the ice cake formed between said surfaces.

8. The combination of a tank, a freezing plate therein, a frame movable in a plane substantially parallel to the freezing surface of said plate, a saw carried by said frame, and mechanism also carried by said frame for actuating said saw.

9. The combination of a tank, a freezing plate therein, a frame movable in a plane substantially parallel to the freezing surface of said plate, a saw carried by said frame, and an electric motor and intermediate gearing also carried by said frame for actuating said saw.

10. The combination of a tank, a vertical freezing plate therein, a frame having two vertical and one horizontal upper member movable in a plane substantially parallel to the freezing surface of said plate, shafts journaled in said vertical frame members, pulleys on the lower extremities of said shafts, a band saw carried by said pulleys, a motor carried by the upper member of said frame and intermediate gearing between said motor and said shafts.

11. The combination of a tank, two vertical freezing plates therein movable to vary the distance between their opposed freezing surfaces, a vertically movable frame disposed between said surfaces, a band saw carried by said frame, and mechanism for actuating said saw.

Signed at New York, borough of Manhattan, in the county of New York and State of New York, this 18th, day of May, A. D. 1908.

JOSEPH D. GALLAGHER.

Witnesses:
M. VAN NORTWICK,
GARRETT BURGERT.

Copies of this patent may be obtained for five cents each, by addressing the "Commissioner of Patents, Washington, D. C."